United States Patent
Bailey et al.

(10) Patent No.: US 6,247,558 B1
(45) Date of Patent: Jun. 19, 2001

(54) APPARATUS FOR REDUCING POWER CONSUMPTION IN A ELEVATOR DOOR PROTECTION SYSTEM

(75) Inventors: Peter Leslie Bailey, Harpenden; David Charles Gaskin, Twyford, both of (GB)

(73) Assignee: Memco Limited, Berkshire (GB)

( * ) Notice: Subject to any disclaimer, the term of this patent is extended or adjusted under 35 U.S.C. 154(b) by 0 days.

(21) Appl. No.: 09/416,585

(22) Filed: Oct. 12, 1999

(30) Foreign Application Priority Data

Oct. 13, 1998 (GB) .................................................. 9822359

(51) Int. Cl.[7] .................................................. B66B 13/26
(52) U.S. Cl. ................................................ 187/317; 49/25
(58) Field of Search ...................................... 127/316, 317, 127/393; 49/25, 26; 160/291, 292, 293.1; 318/280, 283, 286, 466–469

(56) References Cited

U.S. PATENT DOCUMENTS

| 4,029,176 | * | 6/1977 | Mills ........................................ 49/25 |
| 4,621,452 | * | 11/1986 | Deeg ........................................ 49/25 |
| 4,983,896 | * | 1/1991 | Sugiyama et al. .................... 318/286 |
| 5,149,921 | * | 9/1992 | Picado .................................. 187/130 |
| 5,493,812 | | 2/1996 | Teich . |
| 5,866,307 | * | 3/1999 | Full et al. ............................ 187/317 |

FOREIGN PATENT DOCUMENTS

| 2254916 | 10/1992 | (GB) . |
| 090303042 | 11/1997 | (JP) . |
| 090315740 | 12/1997 | (JP) . |
| WO 96/08734 A2 | 3/1996 | (WO) . |

* cited by examiner

Primary Examiner—Jonathan Salata
(74) Attorney, Agent, or Firm—R. Lewis Gable; Cowan, Liebowitz & Latman

(57) ABSTRACT

A elevator door protection system, having an infrared curtain comprising pairs of infrared transmitters and receivers and circuitry responsive to an output of the receiver due to interception for opening the elevator doors, includes detection circuitry which responds (a) when the elevator doors are closed, so as to reduce the usual power supplied to the transmitters; and (b) when the elevator doors open, so as to restore the usual power to the transmitters. Preferably, a time delay is included so that power dissipation is reduced only after a predetermined period following door closure. The invention reduces power consumption of infrared transmitter diodes, hence extending their lifetime.

4 Claims, 4 Drawing Sheets

APPARATUS FOR REDUCING POWER CONSUMPTION IN A ELEVATOR DOOR PROTECTION SYSTEM

FIELD OF INVENTION

This invention relates to apparatus for reducing power consumption in a elevator door protection system. The invention is applicable to systems which have an "infrared curtain", for example, where infrared beam transmitters and receivers simulate a grid of infrared beams across a elevator door opening and where door control circuitry responds to the receiver output, when the beams are intercepted by an object in the elevator door opening, to produce a drive signal to operate elevator door control circuitry for opening the door or doors. The invention enables the power consumption of infrared devices used in such systems to be reduced, when they are not needed to detect an object, thereby providing an improvement in lifetime and reliability.

BACKGROUND TO INVENTION

A typical infrared beam curtain comprises a plurality of infrared emitting and receiving diode pairs, which are vertically spaced apart to simulate a grid-like barrier of infrared beams either between a single door and a slampost, or between centre-closing doors of a elevator car. However, the infrared emitting diodes consume a significant amount of electrical power when operating continuously and this reduces their lifetime.

OBJECTS OF INVENTION

An object of the present invention is increase the lifetime of such infrared emitting diodes in a cost effective and efficient manner.

PRIOR ART

WO-8402413 discloses a system which employs an infrared curtain and in which optical communication takes place, across the door gap, between transmitters and receivers attached to respective doors. However, this reference is primarily concerned with such "wireless" optical communication, whereby control information can be transferred that causes different transmitter/receiver pairs to cooperate to create different infrared beam "patterns" across the door opening. The reference does not teach any technique for reducing the power consumed by infrared emitting diodes (which are subject to continuous scanning under normal operation), in order to extend their lifetime.

Japanese Patent Publication 9315740 (Otis) discloses a system for reducing power supplied to pulsed light emitting diodes, when elevator doors are closed, by adjusting the pulse repetition rate. However, the diodes are provided with fixed width pulses which form a continuous train of pulses. On the other hand, in the present invention, when the doors close, a dead space is introduced or widened between the trains of pulses in each scan in order to conserve power. Otis does not employ such a "dead space" in a "standby mode". Moreover, when the invention is in the "standby mode", one scan can be given periodically in order to check the status of the elevator car.

Other less relevant cited art includes GB 2254916A (Trett); WO 96/08734 (Thomson); U.S. Pat. No. 5493812 (Teich); and JP 090303042 (Tsuuden KK).

SUMMARY OF INVENTION

The present invention is useful in reducing power consumption in a elevator door protection system of the kind having an infrared curtain. Such a system utilises infrared beam transmitters and receivers to provide a beam or beams across a elevator door opening and circuitry responsive to an output of the receivers (when the beam or beams are intercepted by an object in the elevator door opening) to produce a drive signal which causes elevator door control circuitry to open the door or doors in the event of beam interception. The detection circuitry responds when (a) the elevator door or doors are substantially closed, so that the usual power supplied to the transmitters can be reduced; and (b) the elevator door or doors are open or opening, so that the usual power supplied to the transmitter means can then be restored. The transmitters and receivers are normally scanned at a rate of N per second and power is reduced by interposing a predetermined standby interval between each scanning interval (i.e. between the trains of pulses).

Whilst the detection circuitry normally responds when the elevator door or doors are fully closed, it would also work when there is a small gap (e.g. in which there is little or no danger of any object being trapped), between a single door and a slampost, or between centre closing doors. In any event, the power dissipation would not normally be reduced whilst there is any risk of an object intercepting the beam or beams, in the elevator door opening, so as to ensure that the doors will be opened in the event of beam interception.

Preferably, the detection circuitry responds to the output of the infrared receivers to cause the reduction or the restoration of power. For example, the output of the infrared receivers can be used as a means of determining the distance between transmitters and receivers (when beam interception is ignored). Alternatively, or in addition, the output of the infrared receivers will cease changing, due to lack of door motion, when the doors are closed. In a preferred embodiment of the invention, the average receiver output is monitored and when this has been steady for a predetermined period, power reduction can be initiated. The strength of the signal from the infrared receivers is thereby usable to determine that the door or doors are substantially closed, assuming that there is no beam interception due to an object.

In order to take account of a slight possibility that an obstruction, having small dimensions, such as a dog lead or a child rein, might be trapped between the doors before intercepting a beam (to cause the doors to open), the detection circuitry preferably incorporates a time delay which is set so that the power dissipation is reduced only after a predetermined delay following door closure. For example, a delay of 10 seconds from the "door closed" signal would suffice to avoid the aforementioned risk.

Preferably, circuitry is included for maintaining the door or doors closed when the elevator is not in use. This enables power consumption to be reduced during quiet spells and overnight, when the elevator is essentially not in use.

In a typical installation which employs infrared emitter diodes as transmitters and receivers, each set of corresponding transmitter/receiver pairs of diodes are "scanned" at a rate of about 800 diodes per second. For example, if there are 40 IR transmitter diodes (and hence 40 IR receiver diodes in the transmitter/receiver pairs), there are 20 scans/sec of the 40 pairs of diodes. This is equivalent to scanning 800 transmitter diodes each second whereby each transmitter diode receives power for a short period ($\frac{1}{800}$ second) every $\frac{1}{20}$ second. During the period within which the transmitter diode of a diode pair is supplied with power, the transmitter emits an IR beam for the same period during which the receiver output is sampled to determine if there has been any beam interception. This is repeated for the next diode pair. The cycle is continuous from the first pair to the last pair, so that individual transmitter/receiver pairs receive power intermittently at a first cyclic rate.

In accordance with a preferred embodiment of the invention, when the doors are closed (preferably for a predetermined interval), the scanning rate of the set of diode pairs remains the same, but a dead space or standby period is introduced between the scans so as to conserve power, particularly the power supplied to the transmitters. This dead space or standby period which can be, for example, about 2 seconds, enables scanning to be maintained but at a much lower rate. As the individual transmitters (and receivers) receive power at a second cyclic rate lower than the first, the normally high power dissipation of the transmitter diodes can be drastically reduced. Surprisingly, this can reduce the power dissipation in the infrared diode emitters by a factor of about 40 times. As the diode emitters are subjected to more electrical stress than most other components in an infrared curtain and they consume about 50% of the power, a useful improvement in reliability and a reduction in wasted power is achieved.

Recovery from the reduced power dissipation to the usual power dissipation can be achieved rapidly as soon as the doors begin to open. For example, this can be within one scanning cycle of the transmitter/receiver diode pairs. As the average time for opening a elevator door is about two seconds, a test scan can be completed well before there is any requirement for sensing an obstruction in the elevator door opening.

As the elevator doors in a typical building are closed for a large proportion of the time, especially during the night, the benefits of the invention can be particularly significant.

Whilst the typical elevator installations include sets of transmitters and receivers, it would be possible to employ one or more transmitter and receiver pairs, and or to use reflectors for returning transmitter beam or beams to a receiver or receivers.

DESCRIPTION OF DRAWINGS

In the accompanying drawings:

Referring to FIG. 1, a elevator car comprises a pair of centre closing car doors 1a, 1b across which are projected a plurality of infrared beams 2. These simulate a grid of infrared beams which would be intercepted, for example, by a passenger entering or leaving the elevator car. The beams 2 are projected by infrared transmitter diodes which are generally arranged in a vertical strip 3, which is attached adjacent to one closing edge of one door. The diodes are vertically spaced apart along the length of the strip 3, and are connected to a transmitter diode drive circuit 4. Circuit 4 provides power to each transmitter diode in turn, whereby the respective beam of infrared is projected across the door opening. Hence, the grid of beams is made up of a sequence of beams which are generated when the emitter diodes are sequentially supplied with power. This cycle continuously repeats itself and there is normally little or no gap (nor dead space) between supplying the last and first diodes with power.

Figure 1:
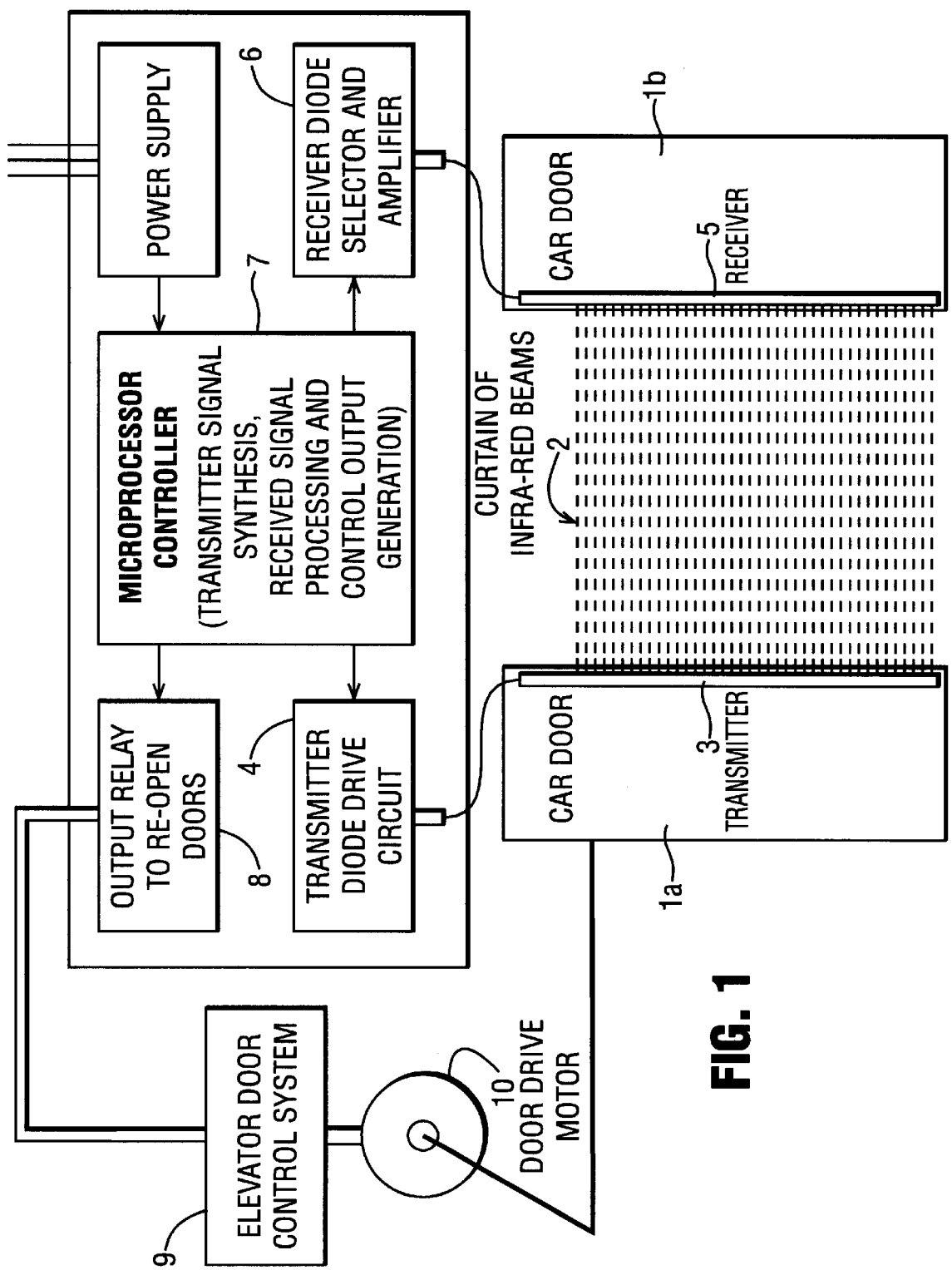
FIG. 1 is a schematic block diagram of an infrared curtain obstruction detection system which incorporates the invention.

The beams 2 are received by corresponding infrared receiver diodes which are similarly vertically spaced apart in a strip 4. The outputs of these receiver diodes are connected to a receiver diode selector and amplifier circuit 6. Circuit 6 powers each receiver diode, although the power dissipation of the receivers is much less than that of the transmitters. When each receiver diode is powered, its output is scanned or sampled in the period in which the corresponding transmitter diode is supplied with power. The receiver outputs are thereby sequentially sampled in order to determine whether or not any transmitter beam has been intercepted. In the event of the interception of any beam, the circuitry 4 causes the microprocessor control 7 to generate a drive signal to an output relay 8, whereby an elevator door control system 9 energises a door drive motor 10, to cause the doors 1a, 1b to open. A power supply 11 provides power to the circuitry which includes the transmitter diode drive circuit 4, receiver diode selector and amplifier circuit 6, microprocessor 7 and relay 8.

In order to determine when the doors 1a, 1b are closed, the receiver output can be sampled as follows. With the receiver diodes operating with minimum gain in the circuitry 6, and with the doors closed, the maximum average signal of the diodes is measured for a period of S seconds (which is the "standby mode delay period"). If the average signal does not change (i.e. because the doors are closed and no beam is intercepted), the circuitry operates so as to cause the system to enter the standby mode of operation. In a typical example, the transmitter/receiver diodes of each pair were separated by about 180mm, or less, with the doors closed and the average signal was measured with this separation (it will be realised that the signal strength will change as the doors move closer together or further apart). A substantially steady signal signifies substantial door closure. The delay period S can be set for about 10 seconds to ensure that it is safe to enter the standby mode of operation (i.e. so as to account for any small object which might become trapped in the closed doors). When the system is in the standby mode of operation, the transmitter/receiver diode pairs are "scanned" every T seconds (the test scan interval) and this may be typically about 2 seconds. During the test scan, the trigger function is inhibited, i.e. interception of a beam 2 does not cause the doors to open. If, as the result of a test scan, the receiver gain needs to be raised above a minimum level, then the receiver gain is set to a nominal value for a typical 1.5 metre door opening and normal scanning is resumed immediately with the trigger function enabled.

Figure 2:
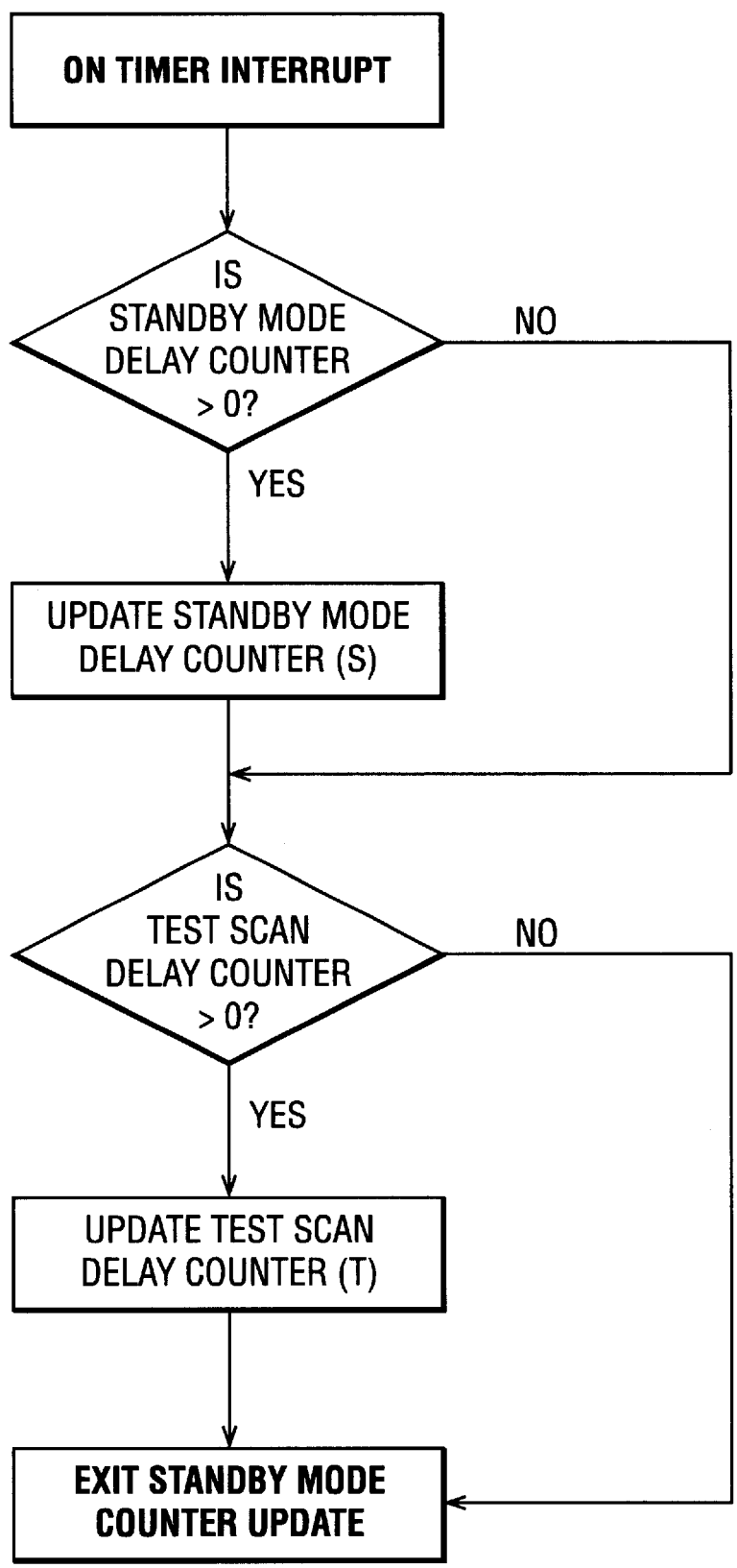
FIGS. 2, 3(a), 3(b) are flow diagrams showing how an embodiment of the invention can be implemented.
Figure 3A:
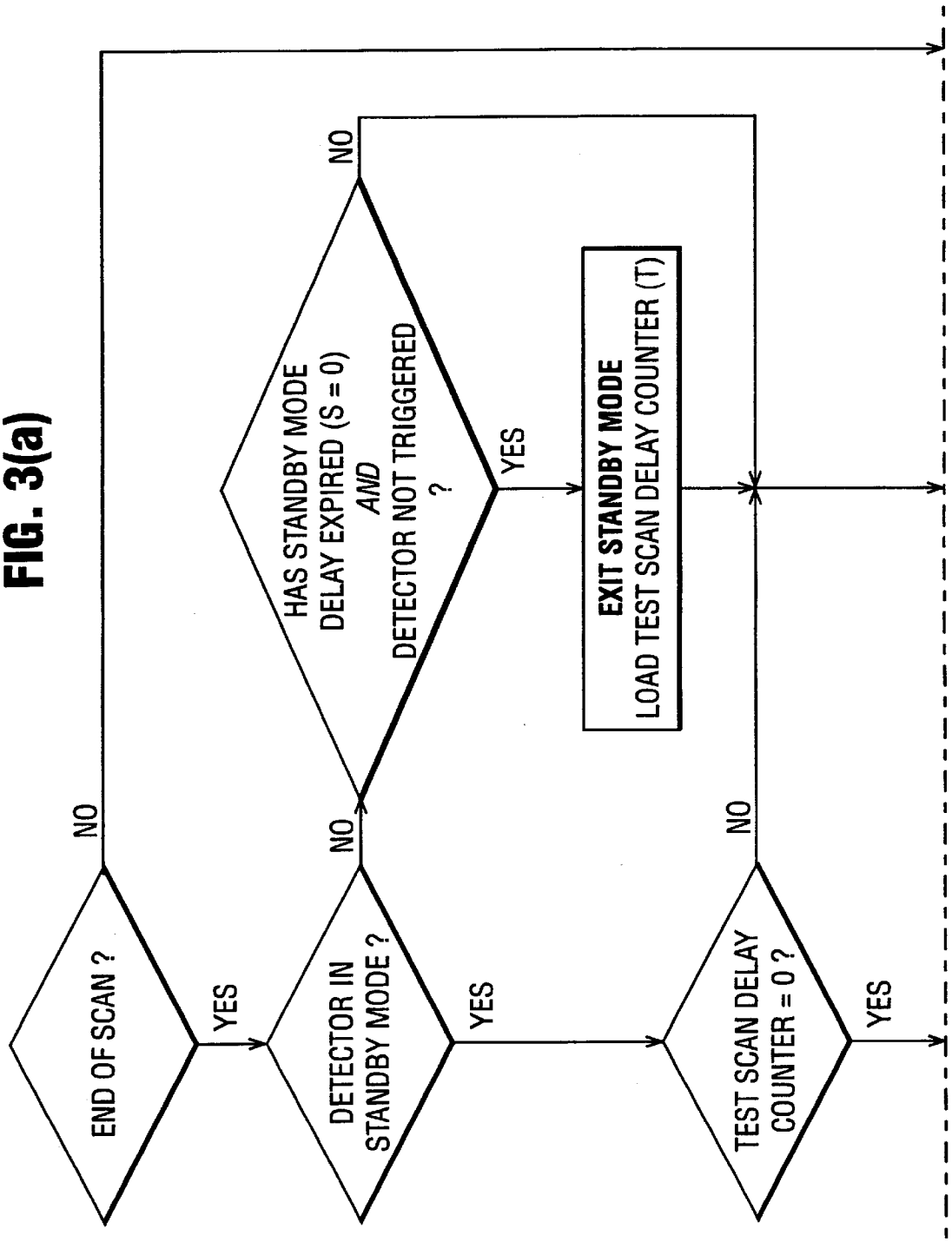
Figure 3B:
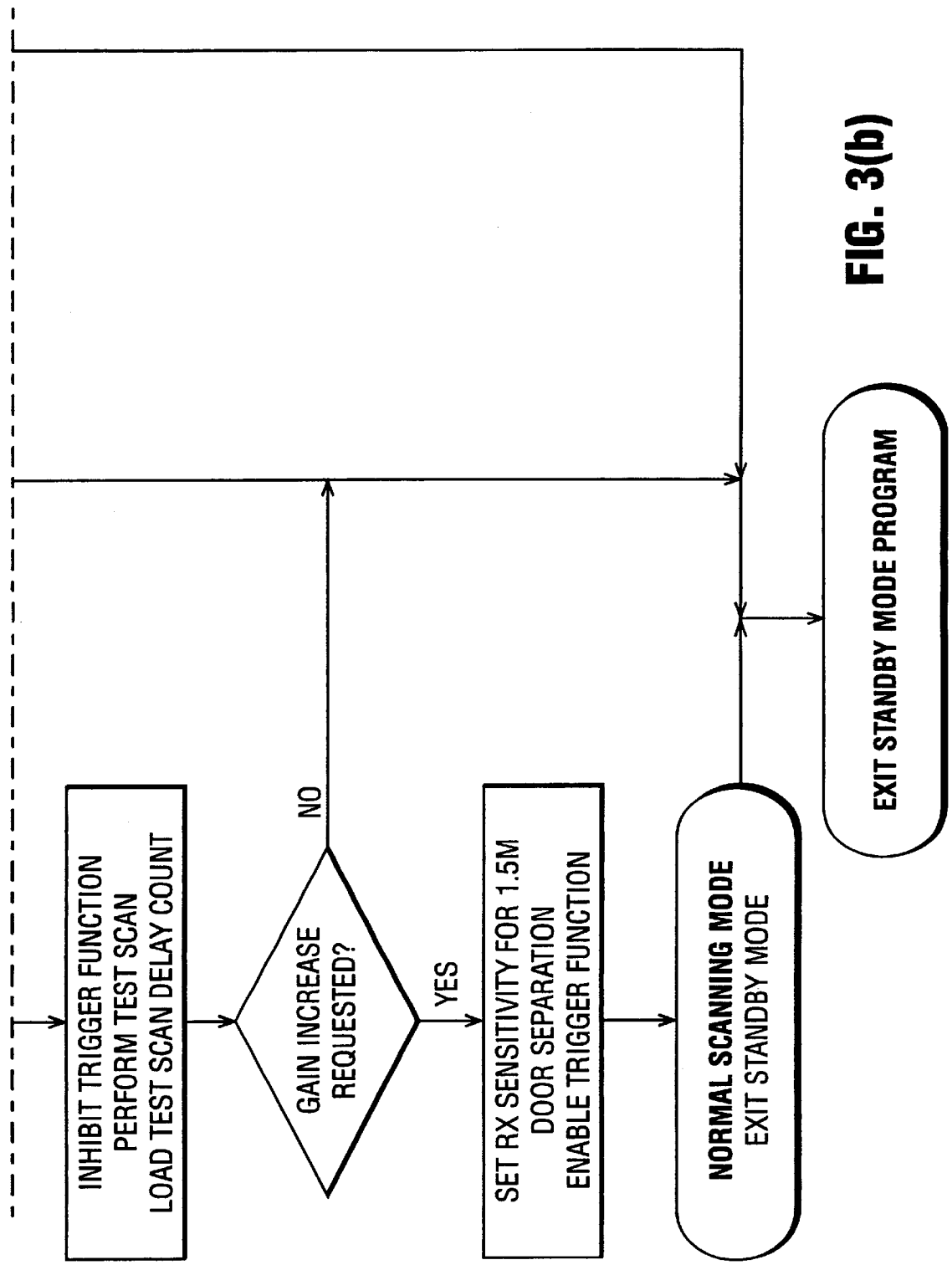

Microprocessor 7 is employed in order to carry out, inter alia, transmitter diode power supply, receiver output signal processing and control functions. It may be programmed in order to enter the standby mode in accordance with the following program. This program is also represented by the flow charts of FIGS. 2 and 3.

Program
At End of each Scan
IF (rx gain at minimum)
{
  IF (detector in standby mode)
  {
    IF (test scan counter=0)
    {
      Inhibit trigger function
      Perform Test scan
      IF (rx gain increase requested)
      {
        Set rx gain=1.5 metre separation
        Enable trigger function
        Exit standby mode operation
      }

```
        ELSE
        {
            Load Test scan delay count down value (T)
        }
    }
    ELSE
    {
        IF (standby mode delay (S)=0 AND detector not
            triggered)
        {
            Enter standby mode operation
            Load Test scan delay count down value (T)
        }
    }
}
ON (TIMER interrupt)
{
    IF (standby delay counter (S)!=0)
    {
        update standby delay counter
    }
    IF (test scan interval counter (T)!=0)
    {
        update test scan interval counter
    }
}
```

The above description relates to examples of the invention and changes or modifications can be made without departing from the scope and spirit of the invention defined by the following claims.

What is claimed is:

1. Apparatus for reducing power consumption in a elevator door protection system, the elevator door protection system having an infrared curtain comprising one or more infrared beam transmitters which provide a beam or beams across a elevator door opening, one or more infrared beam receivers for receiving the beams; circuitry responsive to an output of the receivers when the beam or beams are intercepted by an object in the elevator door opening, whereby the circuitry produces a drive signal; and elevator door control circuitry responsive to the drive signal for opening the door or doors in the event of beam interception;

the apparatus for reducing power consumption comprising detection circuitry which responds when (a) the elevator door or doors are substantially closed, so that the usual power supplied to the transmitters can be reduced; and (b) the elevator door or doors are opening, so that the usual power supplied to the transmitters can be restored, and wherein the transmitters and receivers are normally scanned at a rate of N per second and power is reduced by interposing a standby interval between each scanning interval.

2. Apparatus according to claim 1, wherein the detection circuitry is responsive to the output of the infrared receivers to cause the reduction or restoration of said power dissipation.

3. Apparatus according to claim 2, wherein the detection circuitry incorporates a time delay so that said power dissipation is reduced only after a predetermined delay following door closure.

4. Apparatus according to claim 3, including circuitry for maintaining the doors closed when the elevator is not in use.

* * * * *